(12) United States Patent
Kim

(10) Patent No.: US 8,237,774 B2
(45) Date of Patent: Aug. 7, 2012

(54) METHOD AND APPARATUS FOR OBTAINING IMPROVED PANORAMIC IMAGES

(75) Inventor: Young-sam Kim, Seongnam-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 1093 days.

(21) Appl. No.: 12/157,497

(22) Filed: Jun. 10, 2008

(65) Prior Publication Data

US 2009/0058989 A1 Mar. 5, 2009

(30) Foreign Application Priority Data

Aug. 31, 2007 (KR) .................. 10-2007-0088300

(51) Int. Cl.
*H04N 7/00* (2011.01)
(52) U.S. Cl. .......................... 348/36; 382/284
(58) Field of Classification Search .................. 348/36; 382/284
See application file for complete search history.

(56) References Cited

U.S. PATENT DOCUMENTS

| | | | |
|---|---|---|---|
| 7,239,805 B2 * | 7/2007 | Uyttendaele et al. | 348/36 |
| 2005/0185047 A1 * | 8/2005 | Hii | 348/36 |
| 2006/0078224 A1 * | 4/2006 | Hirosawa | 382/284 |
| 2006/0182437 A1 * | 8/2006 | Williams et al. | 348/218.1 |
| 2007/0139707 A1 * | 6/2007 | Takami et al. | 358/1.15 |
| 2008/0036852 A1 * | 2/2008 | Toyoda et al. | 348/36 |
| 2008/0068452 A1 * | 3/2008 | Nakao et al. | 348/36 |
| 2008/0144967 A1 * | 6/2008 | Struyk | 382/276 |
| 2009/0295906 A1 * | 12/2009 | Kushimoto et al. | 348/36 |

FOREIGN PATENT DOCUMENTS

| | | |
|---|---|---|
| JP | 11-298765 A | 10/1999 |
| KR | 10-0286306 A | 1/2001 |
| KR | 10-2005-0120301 A | 12/2005 |
| KR | 10-2006-0006186 A | 1/2006 |
| KR | 10-2006-0132383 A | 12/2006 |

* cited by examiner

*Primary Examiner* — Oanh Duong
(74) *Attorney, Agent, or Firm* — Drinker Biddle & Reath LLP

(57) ABSTRACT

A digital photographing apparatus capable of more precisely obtaining a panoramic image than conventional cameras, a method of controlling the digital photographing apparatus, and a recording medium storing a program for executing the method. The method of controlling a digital photographing apparatus includes: obtaining a first image according to a user's signal; inverting the pixel values of a portion of the first image; obtaining a second image; and obtaining a third image by combining the first image and the second image.

17 Claims, 10 Drawing Sheets

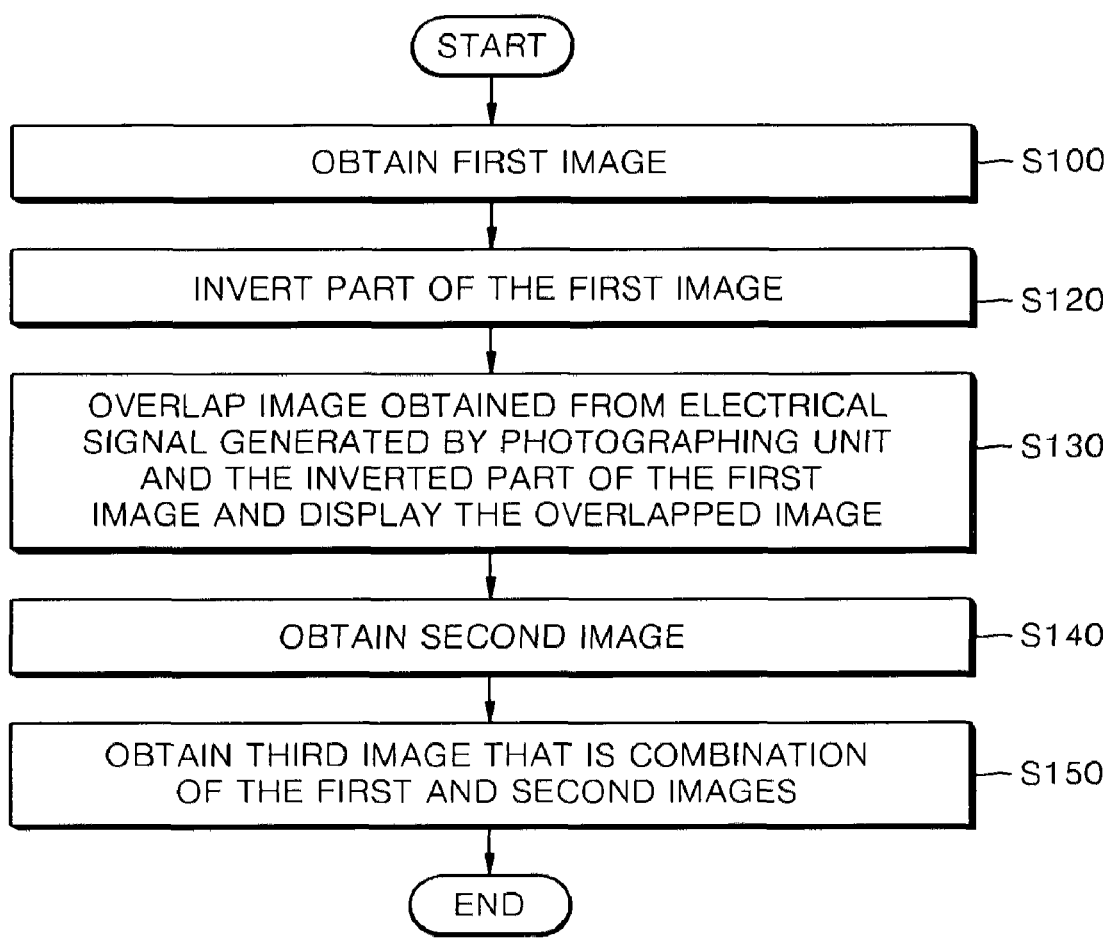

METHOD AND APPARATUS FOR OBTAINING IMPROVED PANORAMIC IMAGES

CROSS-REFERENCE TO RELATED PATENT APPLICATIONS

This application claims the benefit of Korean Patent Application No. 10-2007-0088300, filed on Aug. 31, 2007, in the Korean Intellectual Property Office, the disclosure of which is incorporated herein in its entirety by reference.

BACKGROUND OF THE INVENTION

1. Field of the Invention

The present invention relates to a digital photographing apparatus, a control method therefor, and a recording medium storing a program for executing the control method, and more particularly, to a digital photographing apparatus capable of more precisely obtaining a panoramic image than conventional digital cameras, a method of controlling the digital photographing apparatus, and a recording medium storing a program for executing the method.

2. Description of the Related Art

Conventionally, a digital photographing apparatus stores an image file, which is obtained by a photographing operation in a photographing mode, in a storage medium, and displays the image on a display unit by reproducing the image file stored in the storage medium in a playback mode. The digital photographing apparatus may also reproduce the image file obtained by the photographing operation in the photographing mode. Using a digital photographing apparatus, a panoramic image can be generated by obtaining and combining a first image and a second image, which captures a subject adjacent to the subject captured by the first image.

The conventional digital photographing apparatus typically captures the two images that can be connected to form a panoramic image wholly depending on a user's visual senses. Typically, after capturing the first image, a user moves a conventional digital photographing apparatus according to his/her visual senses and captures the second image to be connected to the first image. However, when using a conventional digital photographing apparatus, a user is usually unable to capture two images that can be precisely connected to form a panoramic image because a user captures the two images based wholly on the user's visual senses. For example, if a user wishes to obtain a panoramic image created by connecting the right edge of a first image to the left edge of a second image, such a panoramic image may appear disconnected in the center because the subject shown at the right edge of the first image may not be precisely aligned with the subject shown at the left edge of the second image.

SUMMARY OF THE INVENTION

The present invention provides a digital photographing apparatus capable of more precisely obtaining than conventional digital cameras a panoramic image created from two images, a method of controlling the digital photographing apparatus, and a recording medium storing a program for executing the method.

According to an aspect of the present invention, there is provided a method of controlling a digital photographing apparatus, the method comprising: obtaining a first image according to a user's signal; inverting a part of the first image; obtaining a second image; and obtaining a third image by combining the first image and the second image.

The method may further comprise: displaying the third image.

The displaying of the first image on the display unit may comprise: displaying only the inverted part of the first image on the display unit.

The displaying of the first image on the display unit may further comprise: overlapping an image obtained from an electrical signal generated by a photographing unit and the inverted part of the first image on the display unit, and displaying the overlapped image on the display unit.

The displaying of the first image on the display unit may further comprise: overlapping a part of the image obtained from the electrical signal generated by the photographing unit (i.e. a preview image) and the inverted part of the first image on the display unit, and displaying the overlapped image on the display unit.

When the image obtained from the electrical signal generated by the photographing unit and the inverted part of the first image are displayed on the display unit, a data value of a sub-pixel in an overlapped region may have a sum of a data value of a corresponding sub-pixel of the image obtained from the electrical signal generated by the photographing unit (i.e. the preview image) and a data value of a corresponding sub-pixel of the inverted part of the first image, and if the sum is greater than a maximum value of a data value of a sub-pixel, the data value of the sub-pixel has the maximum value.

The second image may be automatically obtained when the proportion of white pixels among pixels of the overlapped region is greater than a predetermined proportion. In an alternative embodiment, an indicator may be displayed to the user when the proportion of white pixels to non-white pixels in the overlapped region is greater than a predetermined proportion.

A size of the predetermined proportion can be set by a user.

The displaying of the first image on the display unit may further comprise: displaying both the inverted part of the first image and a partial image of the remaining image that is not inverted on the display unit.

The displaying of the first image on the display unit may further comprise: overlapping a part of the image obtained from the electrical signal generated by the photographing unit and the inverted part of the first image on the display unit, and displaying both the overlapped image and the part of the first image that is not inverted on the display unit.

When the image obtained from the electrical signal generated by the photographing unit and the inverted part of the first image may be displayed on the display unit, a data value of a sub-pixel in an overlapped region has a sum of a data value of a corresponding sub-pixel of the image obtained from the electrical signal generated by the photographing unit and a data value of a corresponding sub-pixel of the inverted part of the first image, and if the sum is greater than a maximum value of a data value of a sub-pixel, the data value of the sub-pixel has the maximum value.

The second image may be automatically obtained when a proportion of white pixels among pixels of the overlapped region is greater than a predetermined proportion.

A size of the predetermined proportion can be set by a user.

The displaying of the first image on the display unit may further comprise: displaying both the inverted part of the first image and the remaining part of the first image that is not inverted on the display unit.

The displaying of the first image on the display unit may further comprise: overlapping a part of the image obtained from the electrical signal generated by the photographing unit and the inverted part of the first image on the display unit, and displaying both the overlapped image and the remaining part of the first image that is not inverted on the display unit.

When the image obtained from the electrical signal generated by the photographing unit and the inverted part of the first image may be displayed on the display unit, a data value of a sub-pixel in an overlapped region has a sum of a data value of a corresponding sub-pixel of the image obtained from the electrical signal generated by the photographing unit and a data value of a corresponding sub-pixel of the inverted partial image, and if the sum is greater than a maximum value of a data value of a sub-pixel, the data value of the sub-pixel has the maximum value.

The second image may be automatically obtained when a proportion of white pixels from among pixels of the overlapped region is greater than a predetermined proportion.

A size of the predetermined proportion can be set by a user.

According to another aspect of the present invention, there is provided a computer readable medium having recorded thereon a computer program for executing the method.

According to another aspect of the present invention, there is provided a digital photographing apparatus comprising: a photographing unit generating an electrical signal according to a received light; an image inverting unit inverting a part of an image corresponding to the electrical signal generated by the photographing unit; and a display unit displaying an image, wherein the photographing unit obtains the electrical signal corresponding to a first image according to a user's signal, the image inverting unit inverts a part of a first image; and the display unit displaying an image obtained from the electrical signal generated by the photographing unit and the inverted part of the first image that are to be overlapped.

The display unit may display the image and the inverted partial image such that a part of the image and the inverted part of the first image on the display unit are overlapped.

In a region where the image and the inverted part of the first image are overlapped, a data value of a sub-pixel in an overlapped region may have a sum of a data value of a corresponding sub-pixel of the image obtained from the electrical signal generated by the photographing unit and a data value of a corresponding sub-pixel of the inverted partial image, and if the sum is greater than a maximum value of a data value of a sub-pixel, the data value of the sub-pixel has the maximum value.

The digital photographing apparatus may further comprise: a panoramic image obtaining unit, wherein when the display unit displays the image and the inverted part of the first image that are to be overlapped, the photographing unit obtains an electrical signal corresponding to a second image, wherein the panoramic image obtaining unit generates a third image that is a combination of the first image and the second image.

The digital photographing apparatus may further comprise: an overlapped proportion determining unit determining a proportion of white pixels among pixels of the overlapped region, wherein the photographing unit automatically obtains the electrical signal corresponding to the second image when the proportion of white pixels determined by the overlapped proportion determining unit is greater than a predetermined proportion.

A size of the predetermined proportion can be set by a user.

BRIEF DESCRIPTION OF THE DRAWINGS

The above and other features and advantages of the present invention will become more apparent by describing in detail exemplary embodiments thereof with reference to the attached drawings in which:

FIG. 11 is a flowchart of a method of controlling a digital photographing apparatus, according to another embodiment of the present invention.

DETAILED DESCRIPTION OF THE INVENTION

The present invention will now be described more fully with reference to the accompanying drawings, in which exemplary embodiments of the invention are shown.

Figure 1:
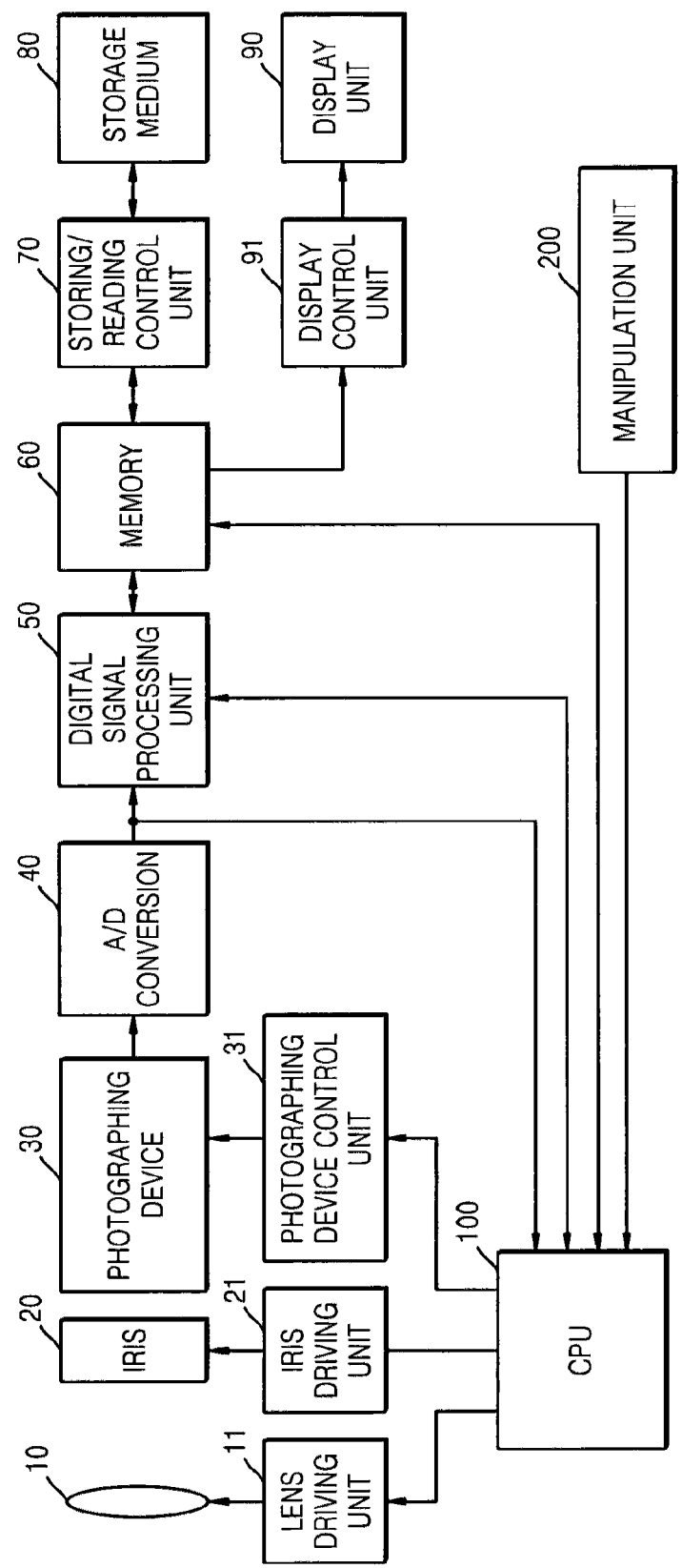
FIG. 1 is a block diagram of a digital photographing apparatus according to an embodiment of the present invention.
Figure 2:
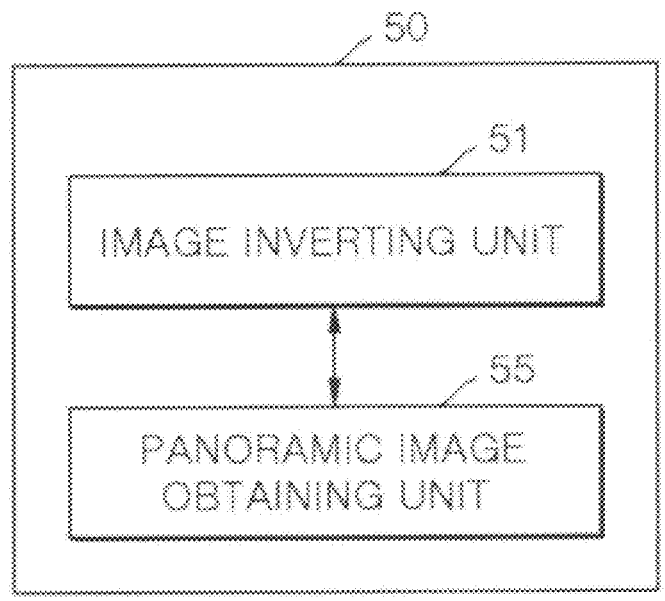
FIG. 2 is a block diagram of a part of the digital photographing apparatus of FIG. 1, according to an embodiment of the present invention.

FIG. 1 is a block diagram of a digital photographing apparatus according to an embodiment of the present invention. FIG. 2 is a block diagram of a part of the digital photographing apparatus of FIG. 1, according to an embodiment of the present invention.

A central processing unit (CPU) 100 controls the entire operation of the digital photographing apparatus. A manipulation unit 200, including keys generating an electrical signal from a user, is included in the digital photographing apparatus. The electrical signal from the manipulation unit 200 is transferred to the CPU 100 so that the CPU 100 can control the digital photographing apparatus.

In a photographing mode (a preview mode), when an electrical signal initiated by the user is transferred to the CPU 100 or is automatically transferred, the CPU 100 identifies the electrical signal and controls a lens driving unit 11, an iris driving unit 21, and a photographing device control unit 31 and according to this control, the position of a lens 10, the opening of an iris 20, and the sensitivity of a photographing device 30 are controlled. If an image signal is output from the photographing device 30, the image signal is converted into digital image data by an analog-to-digital (A/D) conversion unit 40, and is then input to the CPU 100 and a digital signal processing unit 50. The digital signal processing unit 50 performs digital signal processing such as gamma correction and white balance adjustment. The digital signal processing unit 50 can perform a variety of processing in order to capture a panoramic image that will be described later.

The image data output from the digital signal processing unit 50 is transferred through a memory 60 or directly to a display control unit 91. In the present embodiment, the memory 60 includes a read-only memory (ROM) or a random-access memory (RAM) or both. The display control unit 91 controls a display unit 90 so as to display an image on the display unit 90. The image data output from the digital signal processing unit 50 can be input to a storing/reading control unit 70 through the memory 60. The storing/reading control unit 70 records the image data onto a storage medium 80 automatically or according to a command according to the user. Also, the storing/reading control unit 70 can read image data of an image file stored in the storage medium 80, and input the read image data to the display control unit 91, so that the image can be displayed on the display unit 90. However, the image data may be transferred in various modifications. For example, the image data may be transferred without going through the memory 60.

As described above, since the digital signal processing unit 50 performs digital signal processing such as gamma correction and white balance adjustment, it is possible to invert an image or part of an image, or invert the pixel values of the same, and capture a panoramic image. In this regard, referring to FIG. 2, the digital signal processing unit 50 may comprise an image inverting unit 51 and a panoramic image obtaining unit 55. The digital signal processing unit 50 may be embodied with various modifications. For example, the digital signal processing unit 50 may just perform digital signal processing such as gamma correction and white balance adjustment, whereas the image inverting unit 51 and/or the panoramic image obtaining unit 55 may be constituents independent from the digital signal processing unit 50.

The conventional digital photographing apparatus captures the panoramic image wholly depending on a user's visual senses. In more detail, after capturing the first image, a user moves the conventional digital photographing apparatus according to his/her visual senses and captures the second image to be connected to the first image. However, since the conventional digital photographing apparatus determines correlations between the first and second images wholly depending on the user's visual senses, when capturing a third image that is a panoramic image by combining the first and second images, both first and second images are not precisely connected.

In order to address this problem, an embodiment of the digital photographing apparatus and method of controlling the digital photographing apparatus according to the present invention obtains a first image according to a user's signal and displays a part of the first image on the display unit 90. For example, an image of a right edge part of the first image is displayed on a left edge part of the display unit 90. At this time, the digital photographing apparatus overlaps a real-time (video) image, i.e. a preview image, that is obtained from a data signal relating to the real-time (video) image in the photographing device 30 that corresponds to an electrical signal from a received light, and displays the overlapped real-time (video) image on the display unit 90.

The user identifies the real-time (video) image displayed on the display unit 90, and properly moves the digital photographing apparatus, so that the image of the right edge part of the first image displayed on the left edge part of the display unit 90 and the real-time (video) image or preview image can be substantially identical to each other, and a second image corresponding to a preview image is obtained according to the user's signal and is combined with the first image to create a panoramic image.

The digital photographing apparatus of the present embodiment can obtain a more precise panoramic image than a conventional digital photographing apparatus that wholly depends on the user's visual senses. However, since the image of right edge part of the first image displayed on a left edge part of the display unit 90 and the real-time (video) image overlap, the user may not easily confirm the real-time (video) image exactly. Furthermore, although the user determines that the image of right edge part of the first image displayed on the left edge part of the display unit 90 and the real-time (video) image are identical to each other, they may not actually be identical to each other. Thus, a combination part of the first and second image of the panoramic image may not be clear.

In order to avoid this problem, the digital photographing apparatus and method of controlling the digital photographing apparatus according to the present invention obtain the first image according to the user's signal, reverse or invert the pixel values of a part of the first image, and display the inverted partial image on the display unit 90.

Figure 3:
FIGS. 3 through 6B are images for explaining degrees of coincidence of two images, according to an embodiment of the present invention.

FIGS. 3 through 6B are images for explaining degrees of coincidence of two images. An image illustrated in FIG. 3 is obtained using the digital photographing apparatus, images illustrated in FIGS. 4A, 5A, and 6A that the user determines to be the same as the image illustrated in FIG. 3 are obtained. The images illustrated in FIGS. 4A, 5A, and 6A are inverted. The inverted images and the image illustrated in FIG. 3 are overlapped. The overlapped images are FIGS. 4B, 5B, and 6B, respectively.

Figure 4A:
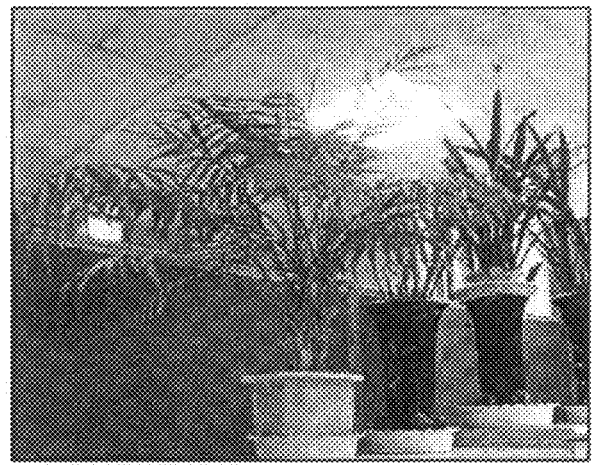
Figure 4B:
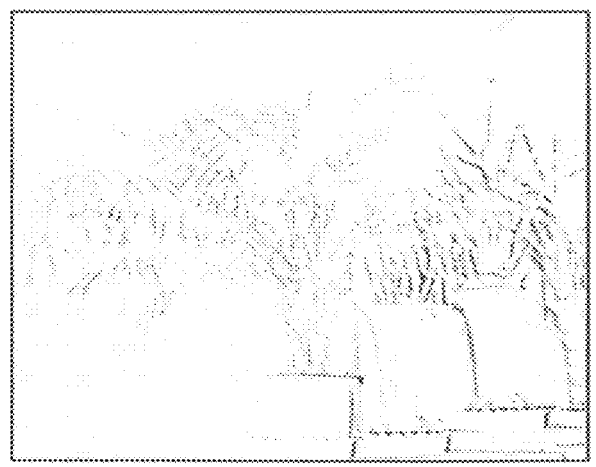
Figure 5A:
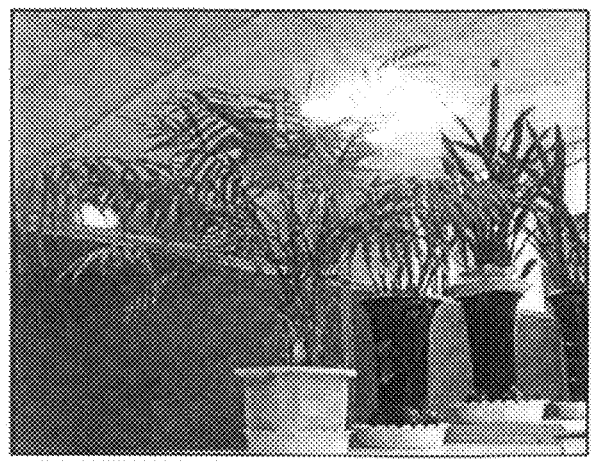
Figure 5B:
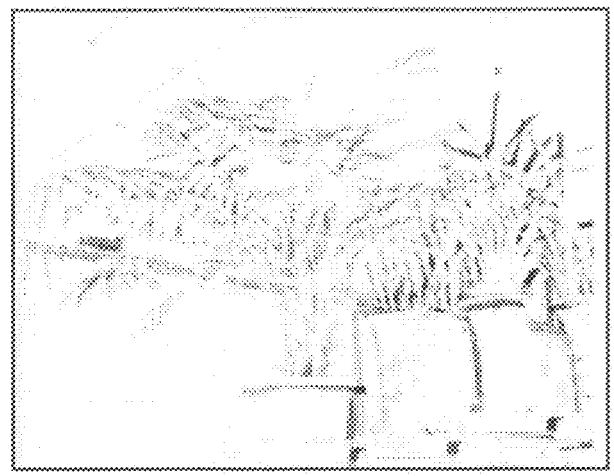
Figure 6A:
Figure 6B:

Each pixel of the images illustrated in FIGS. 4B, 5B, and 6B has, for example, a red sub-pixel, a green sub-pixel, and a blue sub-pixel. Each sub-pixel has its own brightness so that each pixel can embody a full color. If a reversed or inverted sub-pixel of a pixel and the pixel are overlapped, the overlapped pixel has a white color. For example, each sub-pixel has brightness corresponding to a value from among 0 through 255, and a pixel has the red sub-pixel, the green sub-pixel, and the blue sub-pixel. If all three sub-pixels have brightness corresponding to 0, the pixel has the white color. If a red sub-pixel, a green sub-pixel, and a blue sub-pixel of a pixel have brightness corresponding to 124, 72, and 194, respectively, and if the pixel is reversed or inverted, the red sub-pixel, the green sub-pixel, and the blue sub-pixel of the inverted pixel have brightness corresponding to 131 (=255-124), 183 (=255-72), and 61 (=255-194), respectively. Therefore, if all three sub-pixels of the pixel are reversed or inverted, and the reversed or inverted three sub-pixels and the original pixel are overlapped, the red sub-pixel, the green sub-pixel, and the blue sub-pixel of the overlapped pixel have brightness corresponding to 255, and the overlapped pixel has the white color.

Referring to FIGS. 3 through 6B, although the images illustrated in FIGS. 3, 4A, 5A, and 6A are considered to be the same, when the images illustrated in FIGS. 4A, 5A, and 6A are inverted, and the inverted images and the image illustrated in FIG. 3 are overlapped, the overlapped images are different from each other as shown in FIGS. 4B, 5B, and 6B. If the image illustrated in FIG. 3 is inverted, and the inverted image and the image illustrated in FIG. 3 overlap, all the pixels form a white image. However, since the images illustrated in FIGS. 4A, 5A, and 6A are similar to but are different from the image illustrated in FIG. 3, when the images illustrated in FIGS. 4A, 5A, and 6A are inverted, and the inverted images and the image illustrated in FIG. 3 are overlapped, all the pixels do not have white color but as illustrated in FIGS. 4B, 5B, and 6B. The smaller the number of non-white pixels of the overlapped images illustrated in FIGS. 4B, 5B, and 6B is, the more the original images illustrated in FIGS. 4A, 5A, and 6A are identical to the image illustrated in FIG. 3. The whole pixels of the overlapped images illustrated in FIGS. 4B, 5B, and 6B include white pixels of 91%, 86%, and 77%, respectively. In more detail, although the user may identify the images illustrated in FIGS. 4A, 5A, and 6A to be the same as the image illustrated in FIG. 3, the image illustrated in FIG. 5A is more similar to the image illustrated in FIG. 3 than the image illustrated in FIG. 6A, and the image illustrated in FIG. 4A is more similar to the image illustrated in FIG. 3 than the image illustrated in FIG. 5A.

Therefore, the digital photographing apparatus of the present embodiment can obtain a fairly precise panoramic image by inverting an image.

The digital photographing apparatus and method of controlling the digital photographing apparatus according to the present invention obtain the electrical signal corresponding to the first image according to the user's signal in the photographing device 30 that generates the electrical signal corresponding to the received light, invert a part of the first image corresponding to the electrical signal generated by the photographing device 30 in the inverting unit 51, display the inverted partial image on the display unit 90, obtain the second image referring to the inverted partial image, and generate a third image in the combination of the first and second images in the panoramic image obtaining unit 55, thereby obtaining the fairly precise panoramic image.

FIGS. 7A through 7D show images for obtaining a panoramic image using the digital photographing apparatus according to an embodiment of the present invention.

Figure 7A:
FIGS. 7A through 7D are images for obtaining a panoramic image using the digital photographing apparatus according to an embodiment of the present invention.
Figure 7B:
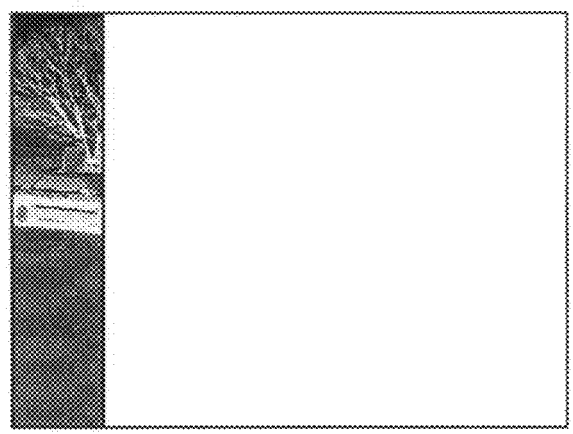

In one embodiment, a first image such as the one illustrated in FIG. 7A is obtained, the right edge part of the first image is inverted, and the inverted part of the first image is displayed on a left edge part of the display unit 90 as illustrated in FIG. 7B. In this regard, a variety of modifications can be made. For example, in another embodiment, an image of a left edge part of the first image is inverted, and the inverted image is displayed on a right edge part of a display unit. In another embodiment, an image of an upper edge part of the first image is inverted, and the inverted image is displayed on a lower edge part of a display unit. In yet another embodiment, an image of a lower edge part of the first image is inverted, and the inverted image is displayed on an upper edge part of a display unit.

Figure 7C:
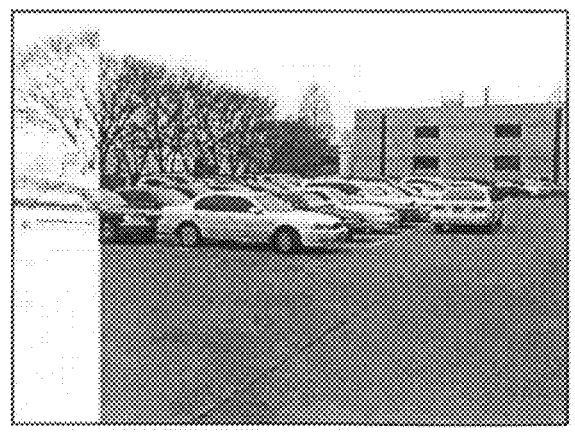

Thereafter, referring to FIG. 7C, a (real-time video) image obtained from an electrical signal generated by the photographing unit 30, i.e. a preview image, and the inverted part of the first image are overlapped and the overlapped image are displayed on the display unit 90. In this case, a partial image of the (real-time video) image obtained from an electrical signal generated by a photographing unit 30 and the inverted partial image of the first image are overlapped and the overlapped image are displayed on the display unit 90. Therefore, an overlapped part of the images is displayed on the left edge part of the display unit 90. In this regard, a variety of modifications can be made. For example, the overlapped image illustrated in FIG. 7C can be displayed on the display unit 90 immediately after obtaining the first image, without displaying the inverted image of the right edge part of the first image illustrated in FIG. 7B on the left edge part of the display unit 90.

Figure 7D:

The user can photograph a second image having a fairly precise correlation with the first image by maximizing white pixels of an overlapped image displayed on the display unit 90 as shown in FIG. 7C. If the second image is obtained according to the user's signal, the panoramic image obtaining unit 55 generates the third image in the combination of the first and second images, i.e., a panoramic image as shown in FIG. 7D. The digital photographing apparatus of the present embodiment may display the third image on the display unit 90 as occasions demand.

Some embodiments of the digital photographing apparatus and method of controlling the digital photographing apparatus according to the present invention use an inverted image to easily obtain a fairly precise panoramic image.

On the other hand, when the partial image of the (real-time video or preview) image obtained from the electrical signal generated by the photographing unit 30 and the inverted partial image of the first image are overlapped and the overlapped image are displayed on the display unit 90, an error may occur. Therefore, some embodiments of the digital photographing apparatus and method of controlling the digital photographing apparatus described herein aid in preventing such an error from occurring. These embodiments will now be described below.

FIGS. 8A through 8D are conceptual diagrams illustrating a data processing operation for obtaining a panoramic image using the digital photographing apparatus according to an embodiment of the present invention.

Figure 8A:
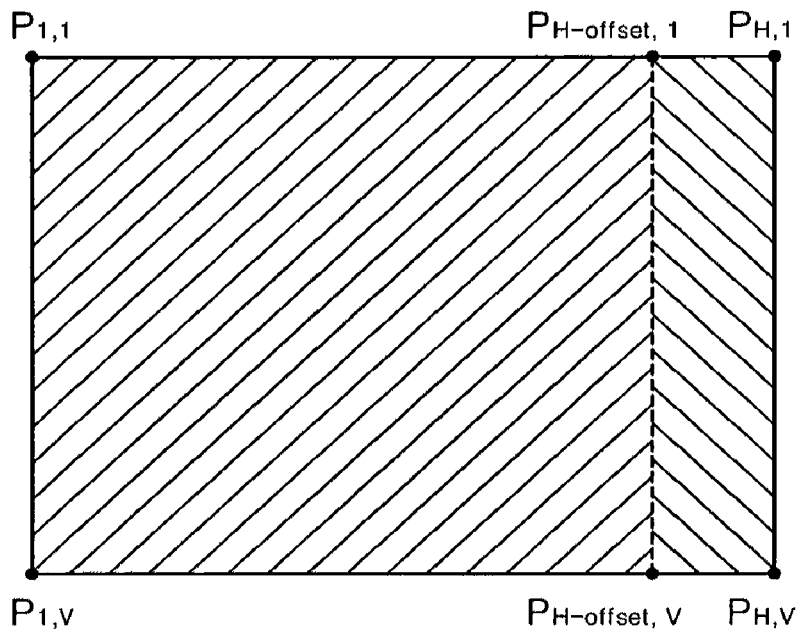
FIGS. 8A through 8D are conceptual diagrams illustrating a data processing operation for obtaining a panoramic image using the digital photographing apparatus according to an embodiment of the present invention.

If the digital photographing apparatus obtains a first image from a user's signal, the first image has a structure as shown in FIG. 8A. Each point of the first image is a pixel in which H pixels are arranged in a horizontal direction, and V pixels are arranged in a vertical direction. A coordinate of a pixel $P_{1,1}$ in a left upper end is (1,1). A coordinate of a pixel $P_{H,V}$ in a right lower end is (H,V). In order to invert a right edge image of the first image and obtain a panoramic image, when a coordinate of a pixel of the first image is (h,v), pixels of a region satisfying H-offset≦h≦H and 1≦v≦V of the first image are provided. The offset is a value used to determine the size of a part of the first image to be inverted, which can be established and modified by the user.

If a pixel includes a red sub-pixel, a green sub-pixel, and a blue sub-pixel, the pixel having the coordinate (h,v) may include data $(D_{Red}, D_{Green}, D_{Blue})_{h,v}$. The data $(D_{Red}, D_{Green}, D_{Blue})_{h,v}$ may have a value from among 0 through 255, respectively. Therefore, to invert the right edge image of the first image is to modify data of the pixels of the region satisfying H-offset≦h≦H and 1≦v≦V of the first image according to equation 1 below.

$$(D_{Red}, D_{Green}, D_{Blue})_{h,v} = (255, 255, 255) - (D_{Red}, D_{Green}, D_{Blue})_{h,v} \text{ where H-offset} \leq h \leq H \text{ and } 1 \leq v \leq V \quad (1)$$

Figure 8B:
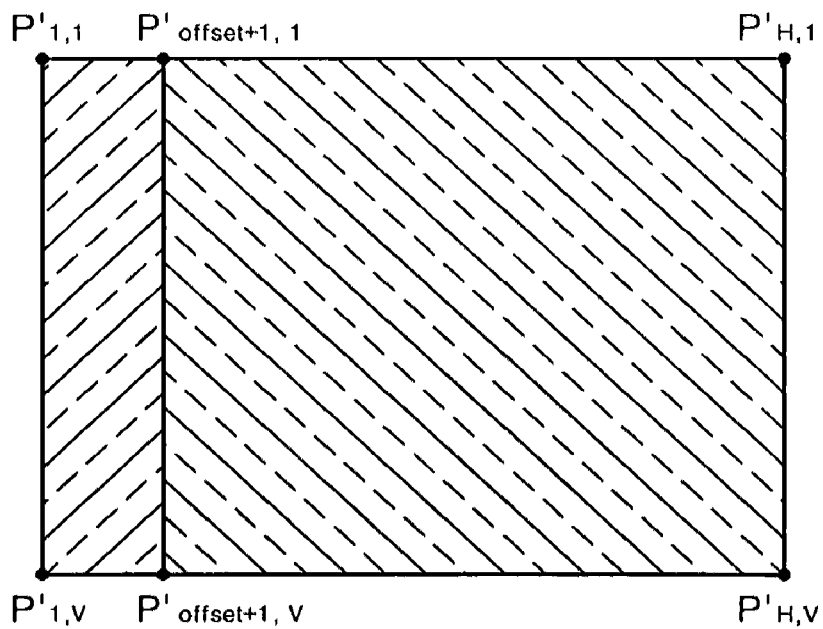

Referring to FIG. 8B, which schematically illustrates a (real-time video) image obtained from an electrical signal generated by the photographing unit 30, each point of the (real-time video) image is a pixel in which H pixels are arranged in a horizontal direction, and V pixels are arranged in a vertical direction. A coordinate of a pixel $P'_{1,1}$ in a left upper end is (1,1). A coordinate of a pixel $P'_{H,V}$ in a right lower end is (H,V). A left edge image of a second image (the real-time video image) and the inverted partial image of the first image are overlapped and the overlapped image is displayed. Therefore, when a coordinate of a pixel of the second image is (h,v), pixels of a region satisfying 1≦h≦offset+1 and 1≦v≦V of the second image are overlapped.

Figure 8C:
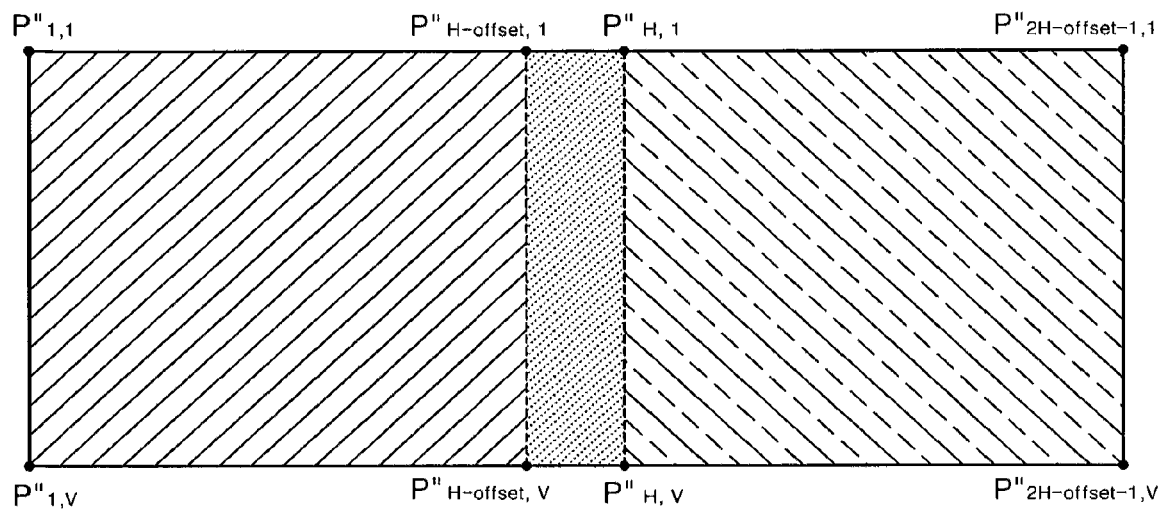

Referring to FIG. 8C, which schematically illustrates an overlapped image where the right edge part of the first image illustrated in FIG. 8A and the left edge part of the second image are overlapped, 2H-offset−1 pixels are arranged in a horizontal direction, and V pixels are arranged in a vertical direction. Each pixel $P'''_{h,v}$ of the image illustrated in FIG. 8C has data according to equations 2 through 4, $$(D_{Red}, D_{Green}, D_{Blue})''_{h,v} = (D_{Red}, D_{Green}, D_{Blue})_{h,v} \text{ if } 1 \leq h < H\text{-offset and } 1 \leq v \leq V \quad (2)$$

$$(D_{Red}, D_{Green}, D_{Blue})''_{h,v} = \min\{(D_{Red}, D_{Green}, D_{Blue})_{h,v} + (D_{Red}, D_{Green}, D_{Blue})'_{h-H+offset+1,v}, (255, 255, 255)\} \text{ if H-offset} \leq h \leq H \text{ and } 1 \leq v \leq V \quad (3)$$

$$(D_{Red}, D_{Green}, D_{Blue})''_{h,v} = (D_{Red}, D_{Green}, D_{Blue})'_{h-H+offset+1,v} \text{ if } H < h \leq 2H\text{-offset}-1 \text{ and } 1 \leq v \leq V \quad (4)$$

wherein, $\min\{(a_1, b_1, C_1), (a_2, b_2, C_2)\}$ denotes $(\min(a_1, a_2), \min(b_1, b_2), \min(c_1, c_2))$, and $\min(a_1, a_2)$ denotes a small value between $a_1$ and $a_2$.

The data $(D_{Red}, D_{Green}, D_{Blue})'''_{h,v}$ of a pixel P''' in a region satisfying $1 \leq h <$ H-offset, H$<h\leq$2H-offset$-1$, and $1\leq v\leq V$ is data of a pixel P or a pixel P' according to equations 2 and 4. However, since the data of the pixel P''' in a region satisfying H-offset$\leq h\leq$H and $1\leq v\leq V$ reflects the overlapped, inverted data of the pixel P and the data of the pixel P', if the data of the pixel P prior to the inverting and the data of the pixel P' are identical to each other, the sum of the inverted data of the pixel P and the data of the pixel P' is (255, 255, 255) and thus the overlapped pixel has a white color. However, if the data of the pixel P prior to the inverting and the data of the pixel P' are not identical to each other, one of the three components that is the sum of the inverted data of the pixel P and the data of the pixel P' may have a value greater than 255, which may cause a display error. Before obtaining the second image that is to be combined with the first image, the user moves the digital photographing apparatus to determine the location thereof in order to obtain the second image, which may cause the display error mentioned above.

In order to prevent the occurrence of the error, when the (real-time video) image obtained from the electrical signal generated by the photographing unit 30 and the inverted partial image of the first image are displayed on the display unit 90, if the sum of a data value of each sub-pixel of the (real-time video) image obtained from the electrical signal generated by the photographing unit 30 and a data value of each sub-pixel of the inverted partial image of the first image in an overlapped region is greater than a maximum value of a data value of a sub-pixel, the maximum value is the data value of the sub-pixel, thereby preventing the display error. This will now be described below.

Since the three components of data of a pixel have a value between 0 and 255, respectively, the three components that are the sum of the inverted data of the pixel P and the data of the pixel P' must have a value between 0 and 255, respectively. Therefore, if each of the three components that are the sum of the inverted data of the pixel P and the data of the pixel P' have a value less than 255 referring to equation 3, the pixel P''' has the data as it is, and if one of the three components that are the sum of the inverted data of the pixel P and the data of the pixel P' have a value greater than 255, the component has the value of 255, thereby preventing the occurrence of the error.

A variety of modifications can be made. For example, although data $(D_{Red}, D_{Green}, D_{Blue})'$ has a variety of values in a region satisfying H$<h\leq$2H-offset$-1$ and $1\leq v\leq V$, since data $(D_{Red}, D_{Green}, D_{Blue})_{h,v}$ does not have a value, the data $(D_{Red}, D_{Green}, D_{Blue})'$ may be made (0, 0, 0) in the region satisfying H$<h\leq$2H-offset$-1$ and $1\leq v\leq V$ and equations 3 and 4 are unified into equation 3.

Figure 8D:
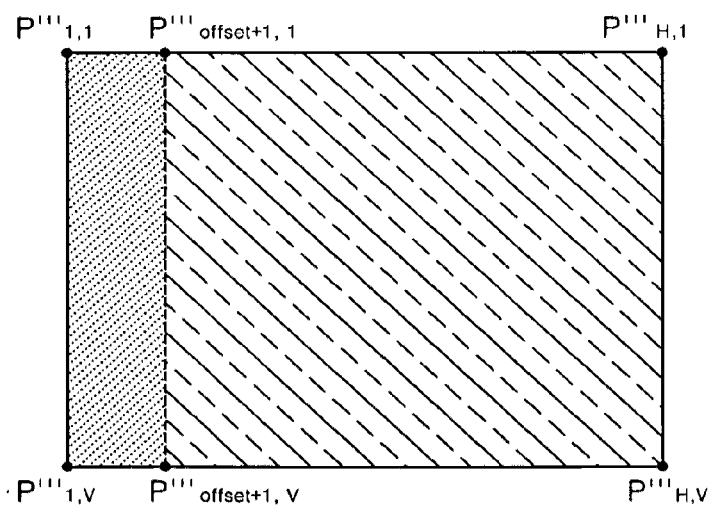

Referring to FIG. 8D, which, like FIG. 8C, schematically illustrates an image to be displayed o the display unit 90 by overlapping the first image and the second image and correcting the overlapped image, each point is a pixel in which H pixels are arranged in a horizontal direction, and V pixels are arranged in a vertical direction. A coordinate of a pixel $P'''_{1,1}$ in a left upper end is (1,1). A coordinate of a pixel $P'''_{H,V}$ in a right lower end is (H,V). The image illustrated in FIG. 8D corresponds to the region illustrated in FIG. 8C satisfying H-offset$\leq h\leq$2H-offset$-1$ and $1\leq v\leq V$. The data $(D_{Red}, D_{Green}, D_{Blue})'''_{h,v}$ of the pixel $P'''_{h,v}$ can be expressed according to equation 5 below.

$$(D_{Red}, D_{Green}, D_{Blue})'''_{h,v} = (D_{Red}, D_{Green}, D_{Blue})'''_{h+H-offset-1,v} \text{ where}$$
$$1\leq h\leq H \text{ and } 1\leq v\leq V \qquad 5)$$

Although it is described that the right edge part of the first image is inverted, the inverted partial image is displayed on the left edge part of the display unit 90, and the inverted partial image and the second image (real-time video) correspond to the electrical signal generated by the photographing unit are overlapped with reference to FIGS. 8A through 8D, a variety of modifications can be made with regard to the location of the part of the first image that is to be inverted.

Furthermore, a variety of modifications can be made although the data value of each sub-pixel has the value between 0 and 255 in the present embodiment. For example, some embodiments of a digital photographing apparatus according to the present invention may not display an error if the value of a sub-pixel is greater than 255.

Figure 9:
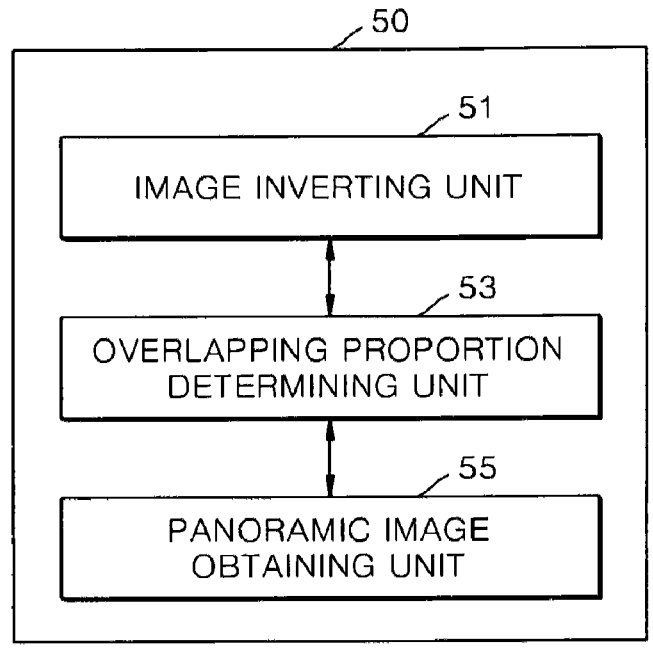
FIG. 9 is a block diagram of a digital photographing apparatus according to another embodiment of the present invention.

FIG. 9 is a block diagram of a digital photographing apparatus according to another embodiment of the present invention. The digital photographing apparatus and method for controlling the digital photographing apparatus of the present embodiment further comprise an overlapped proportion determining unit 53, which is different from the previous embodiment with reference to FIG. 2.

Although FIG. 9 shows an embodiment in which the overlapped proportion determining unit 53 is included in the digital signal processing unit 50, a variety of modifications can be made. For example, in an alternative embodiment, the digital signal processing unit 50 performs digital signal processing such as gamma correction and white balance adjustment, and the overlapped proportion determining unit 53 may be a separate constituent from the digital signal processing unit 50. This also applies to an image inverting unit 51 and/or a panoramic image obtaining unit 55, which may also be separate from the digital signal processing unit 50. The overlapped proportion determining unit 53 determines a proportion of white pixels among overlapped pixels as shown in FIG. 7C.

As described above, when an inverted image and another image are overlapped, the higher the proportion of white pixels of an overlapped region is, the more precisely identical both images are to each other. Therefore, the digital photographing apparatus and method for controlling the digital photographing apparatus of the present embodiment automatically obtain an electrical signal corresponding to a second image when the proportion of white pixels among overlapped pixels determined by the overlapped proportion determining unit 53 is greater than a previously established proportion. Thus, although the user does not operate the digital photographing apparatus, the digital photographing apparatus can automatically obtain the second image having fairly precise correlations with the first image, so that the user can easily obtain a fairly precise panoramic image. The previously established proportion such as 90% or the like can be set or made by the user. This applies to embodiments to be described later and modifications thereof.

In an alternative embodiment, an indicator may be displayed to the user when the proportion of white pixels to non-white pixels in the overlapped region is greater than a predetermined proportion. Such an indicator may, for example, notify the user that the camera is properly positioned for capturing the second image to be combined with the first image.

Meanwhile, in some embodiments, only the inverted partial image of the first image is displayed on the display unit 90 as shown in FIGS. 7B, 7C, and 8D. However, the present invention is not limited thereto and a variety of modifications can be made. For example, in the embodiment shown in FIG. 8C, the inverted partial image of the first image and the remaining image thereof that is not inverted may be displayed on the display unit 90. In this regard, as shown in FIG. 8C, the remaining image thereof that is not inverted is displayed on a left image of the inverted partial image of the first image. A part of the (real-time video) image obtained from the electrical signal generated by the photographing unit 30 and the inverted partial image of the first image are overlapped and the overlapped image is displayed on the display unit 90.

Unlike FIGS. 7B and 7D, the inverted partial image of the first image and a part of the remaining image thereof that is not inverted may be displayed on the display unit 90. In this regard, the part of the remaining image thereof that is not inverted is displayed on a left part of the inverted partial image of the first image. A part of the (real-time video) image obtained from the electrical signal generated by the photographing unit 30 and the inverted partial image of the first image are overlapped and the overlapped image is displayed on the display unit 90.

According to the digital photographing apparatus and method for controlling the digital photographing apparatus of the present embodiment, the user can easily obtain a fairly precise panoramic image using an inverted image.

Figure 10:
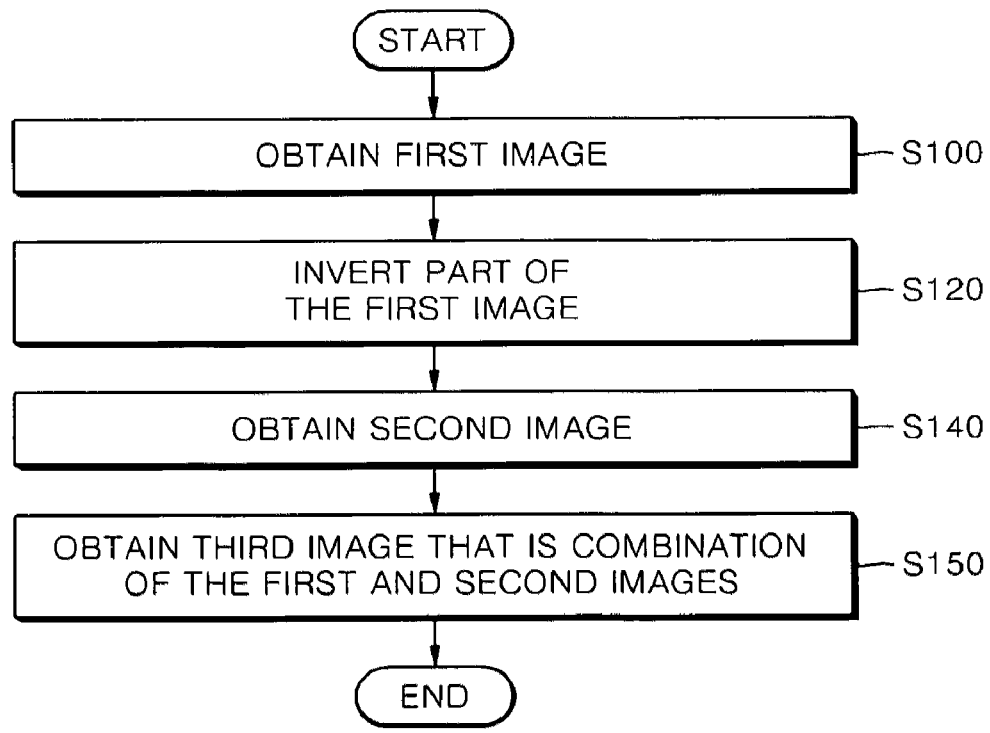
FIG. 10 is a flowchart of a method of controlling a digital photographing apparatus, according to an embodiment of the present invention.

FIG. 10 is a flowchart of a method of controlling a digital photographing apparatus, according to an embodiment of the present invention. Referring to FIG. 10, a first image is obtained (Operation 100), and then a part of the first image is inverted and the inverted partial image is displayed on a display unit (Operation 120). A second image is obtained referring to the inverted partial image of the first image (Operation 140). The first image and the second image are combined to obtain a third image that is a panoramic image (Operation 150).

FIG. 11 is a flowchart of a method of controlling a digital photographing apparatus, according to another embodiment of the present invention. Referring to FIG. 11, the method further comprises overlapped a (real-time video) image obtained from an electrical signal generated by a photographing unit and the inverted partial image of the first image and displaying the overlapped image (Operation 130), compared to the method described with reference to FIG. 10. Therefore, a user can easily change a location of the digital photographing apparatus in order to obtain the second image that is correlated with the first image.

According to the present embodiments and their modifications, a program executing the method of controlling a digital photographing apparatus can be stored in a recording medium. The recording medium may be the storage medium 80 shown in FIG. 1, the memory 60 shown in FIG. 1, or any other recording media. Examples of computer readable recording media include a magnetic storage medium, e.g., read-only memory (ROM), a floppy disk, a hard disc, an optical recording medium, e.g., a CD-ROM, a digital versatile disc (DVD), and the CPU 100 or a part thereof as shown in FIG. 1.

As described above, in a digital photographing apparatus, a method of controlling the same, and a recording medium storing a program for executing the method, according to the present invention, it is possible to more precisely obtain a panoramic image.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of controlling a digital photographing apparatus, the method comprising:
   obtaining a first image;
   inverting pixel values of a first portion of the first image;
   displaying a real-time preview image partially overlapped with the inverted first portion of the first image;
   obtaining a second image corresponding to the displayed real-time preview image; and
   creating a third image by combining at least a second portion of the first image and at least a portion of the second image,
   wherein a data value of a sub-pixel in the overlap of the preview image and the inverted first portion of the first image is adjusted to a predetermined value if the sum of a data value of a corresponding sub-pixel of the preview image and a data value of a corresponding sub-pixel of the inverted first portion of the first image is greater than the maximum value of a pixel.

2. The method of claim 1, further comprising:
   displaying the third image.

3. The method of claim 1, further comprising:
   displaying the inverted first portion of a first image on a display unit of the digital photographing apparatus.

4. The method of claim 1, wherein a data value of a sub-pixel in the overlap of the preview image and the inverted first portion of the first image is the sum of a data value of a corresponding sub-pixel of the preview image and a data value of a corresponding sub-pixel of the inverted first portion of the first image.

5. The method of claim 1, further comprising automatically obtaining the second image when a proportion of white pixels to non-white pixels in the overlap of the preview image and the inverted first portion of the first image is greater than a predetermined proportion.

6. The method of claim 5, wherein a size of the predetermined proportion can be set by a user.

7. The method of claim 1, further comprising displaying an indicator when a proportion of white pixels to non-white pixels in the overlap of the preview image and the inverted first portion of the first image is greater than a predetermined proportion.

8. The method of claim 1, further comprising displaying the inverted first portion of the first image with at least a third portion of the first image that is not inverted.

9. The method of claim 1, further comprising obtaining the second image substantially corresponding to the preview image in response to a user input provided when a user observing the preview image partially overlapped with the inverted first portion of the first image determines that the preview image and the first image are substantially aligned.

10. The method of claim 1, wherein the partial overlap of the preview image with the inverted first portion of the first image depicts an extent of alignment of the first image and the preview image.

11. A non-transitory computer readable recording medium having stored thereon a computer readable program comprising:
   instructions for inverting pixel values of a first portion of a first image;
   instructions for overlapping the inverted first portion of the first image and a first portion of a second image; and
   instructions for combining at least a second portion of the first image and at least a second portion of the second image to create a panoramic image,
   wherein a data value of a sub-pixel in the overlap of the first portion of the second image and the inverted first portion of the first image is adjusted to a predetermined value if the sum of a data value of a corresponding sub-pixel of the first portion of the second image and a data value of a corresponding sub-pixel of the inverted first portion of the first image is greater than the maximum value of a pixel.

12. A digital photographing apparatus comprising:
- a photographing unit that generates an electrical signal according to received light;
- an image inverting unit that inverts pixel values of a portion of a first image corresponding to the electrical signal generated by the photographing unit; and
- a display unit that displays a real-time preview image so that at least a portion of the real-time preview image overlaps with the inverted portion of the first image; and
- a panoramic image obtaining unit for generating a panoramic image by combining at least a second portion of the first image and at least a portion of a second image,
- wherein a data value of a sub-pixel in the overlap of the preview image and the inverted first portion of the first image is adjusted to a predetermined value if the sum of a data value of a corresponding sub-pixel of the preview image and a data value of a corresponding sub-pixel of the inverted first portion of the first image is greater than the maximum value of a pixel.

13. The digital photographing apparatus of claim 12, wherein a data value of a sub-pixel in the overlap of the preview image and the inverted portion of the first image is the sum of a data value of a corresponding sub-pixel of the preview image and a data value of a corresponding sub-pixel of the inverted portion of the first image.

14. The digital photographing apparatus of claim 12, further comprising:
- an overlapped proportion determining unit that determines a proportion of white pixels to non-white pixels in the overlap of the preview image and the inverted portion of the first image.

15. The digital photographing apparatus of claim 14, wherein the photographing unit automatically obtains a second image substantially corresponding to the preview image when the proportion of white pixels to non-white pixels is greater than a predetermined proportion.

16. The digital photographing apparatus of claim 15, wherein a value of the predetermined proportion can be set by a user.

17. The digital photographing apparatus of claim 14, wherein an indicator is displayed when the proportion of white pixels to non-white pixels is greater than a predetermined proportion.

* * * * *